United States Patent
Calahan (10) Patent No.: US 9,965,634 B2
(45) Date of Patent: May 8, 2018

(54) SPACE-EFFICIENT STORAGE OF ENCRYPTED DATA

(71) Applicant: salesforce.com, inc., San Francisco, CA (US)

(72) Inventor: Patrick Calahan, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 228 days.

(21) Appl. No.: 15/081,317

(22) Filed: Mar. 25, 2016

(65) Prior Publication Data

US 2017/0206362 A1 Jul. 20, 2017

Related U.S. Application Data

(60) Provisional application No. 62/279,491, filed on Jan. 15, 2016.

(51) Int. Cl.

| G06F 21/00 | (2013.01) |
|---|---|
| G06F 21/60 | (2013.01) |
| G06F 17/30 | (2006.01) |
| H04L 9/06 | (2006.01) |

(52) U.S. Cl.
CPC ...... *G06F 21/602* (2013.01); *G06F 17/30289* (2013.01); *G06F 17/30312* (2013.01); *G06F 17/30386* (2013.01); *H04L 9/0618* (2013.01)

(58) Field of Classification Search
CPC .................................................... G06F 21/602
USPC ........................................................ 713/189
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |

(Continued)

*Primary Examiner* — Longbit Chai
(74) *Attorney, Agent, or Firm* — Schwabe Williamson & Wyatt (57) ABSTRACT

An encryption platform may identify language characters in database fields and determine which of multiple encoding schemes more efficiently encodes the language characters. The encryption platform may use the selected encoding scheme to encode plaintext into a byte array and then encrypt the byte array into ciphertext. The encryption platform may assign encoding flags to the ciphertext identifying the encoding scheme used for encoding the plaintext. The encryption platform then may use the encoding flag to determine which encoding schemes to use for decoding the data back into plaintext. Using the different encoding schemes allows encrypted data to fit better into database storage structures. The encryption platform also may enable users to select different fields for different selectable objects for encoding and encrypting.

18 Claims, 7 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,725,509 B1 * | 5/2014 | Harb ............... G06F 17/277 704/10 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |

(56) References Cited

U.S. PATENT DOCUMENTS

| | | |
|---|---|---|
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |

* cited by examiner

SPACE-EFFICIENT STORAGE OF ENCRYPTED DATA

The present application claims priority to U.S. Provisional Patent Ser. No. 62/279,491 Entitled: SPACE-EFFICIENT STORAGE OF ENCRYPTED FIELD VALUES, filed Jan. 15, 2016, which is herein incorporated by reference in its entirety

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

The technology relates to data encryption and more specifically to encoding data in database systems.

BACKGROUND

Users may want to encrypt data stored in database systems. Some encryption schemes may only encrypt binary bit values. Therefore, the database system may need to encode text characters into a byte array prior to encryption. However, the encrypted byte array (e.g., ciphertext) may be longer than the unencrypted text characters (e.g., plaintext). This may create storage problems in database columns with size limits based on a maximum expected plaintext size.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

Figure 1A:
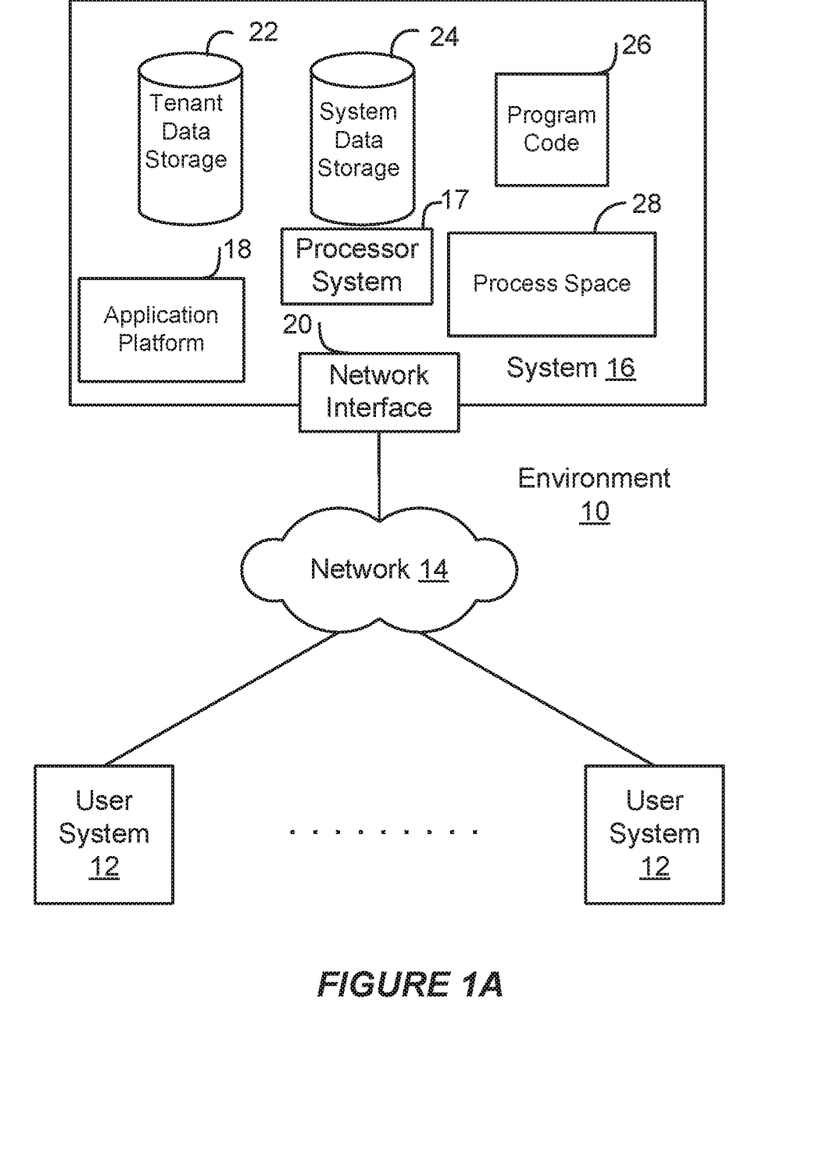
FIG. 1A shows a block diagram of an example environment in which an on-demand database service can be used according to some implementations.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
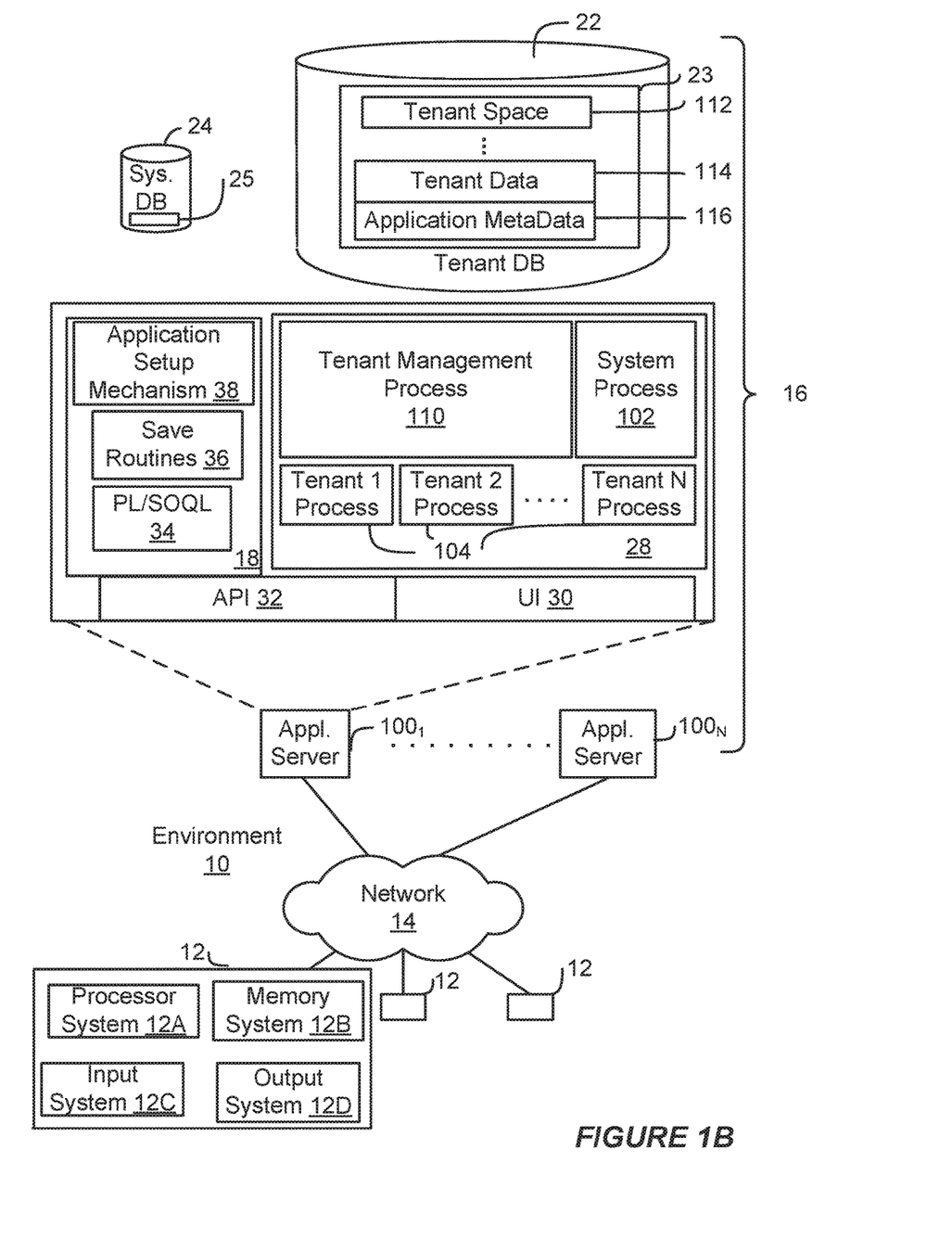
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100.

In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Space-Efficient Storage of Encrypted Data

Plaintext data may be encoded into a binary stream/array before being encrypted. Some database systems may support multi-byte languages, such as Latin and Chinese. Encoding schemes like 8 bit unicode transform format (UTF8) may efficiently encode Latin characters but may not efficiently encode non-Latin characters. The database system may support the multi-byte languages by allocating extra bytes, such as 3× the number of characters and encoding the text with one encoding scheme, such as an UTF8. However, other encoding schemes, such as 16 bit unicode transform format (UTF16), may more efficiently encode the non-Latin characters.

An encryption platform may identify language characters in database fields and determine which of multiple encoding schemes more efficiently encodes the language characters. The encryption platform may use the most efficient encoding scheme to encode plaintext into a byte array and then encrypt the byte array into ciphertext. The encryption platform may assign encoding flags to the ciphertext identifying the encoding scheme used for encoding the plaintext. The encryption platform then may use the encoding flag to identify the encoding scheme for decoding the data back into plaintext. Using the different encoding schemes allows encrypted data to fit better into database storage structures. The encryption platform also may enable users to select different fields for different selectable objects for encoding and encrypting.

The following description below refers to field values, language characters, text, plaintext, ciphertext, byte arrays, or the like, or any combination thereof. However the encryption platform may encode any type of data for any type of object, record, field, table, column, row, or the like, or any combination thereof stored in a database system or any other type of storage device.

Figure 2:
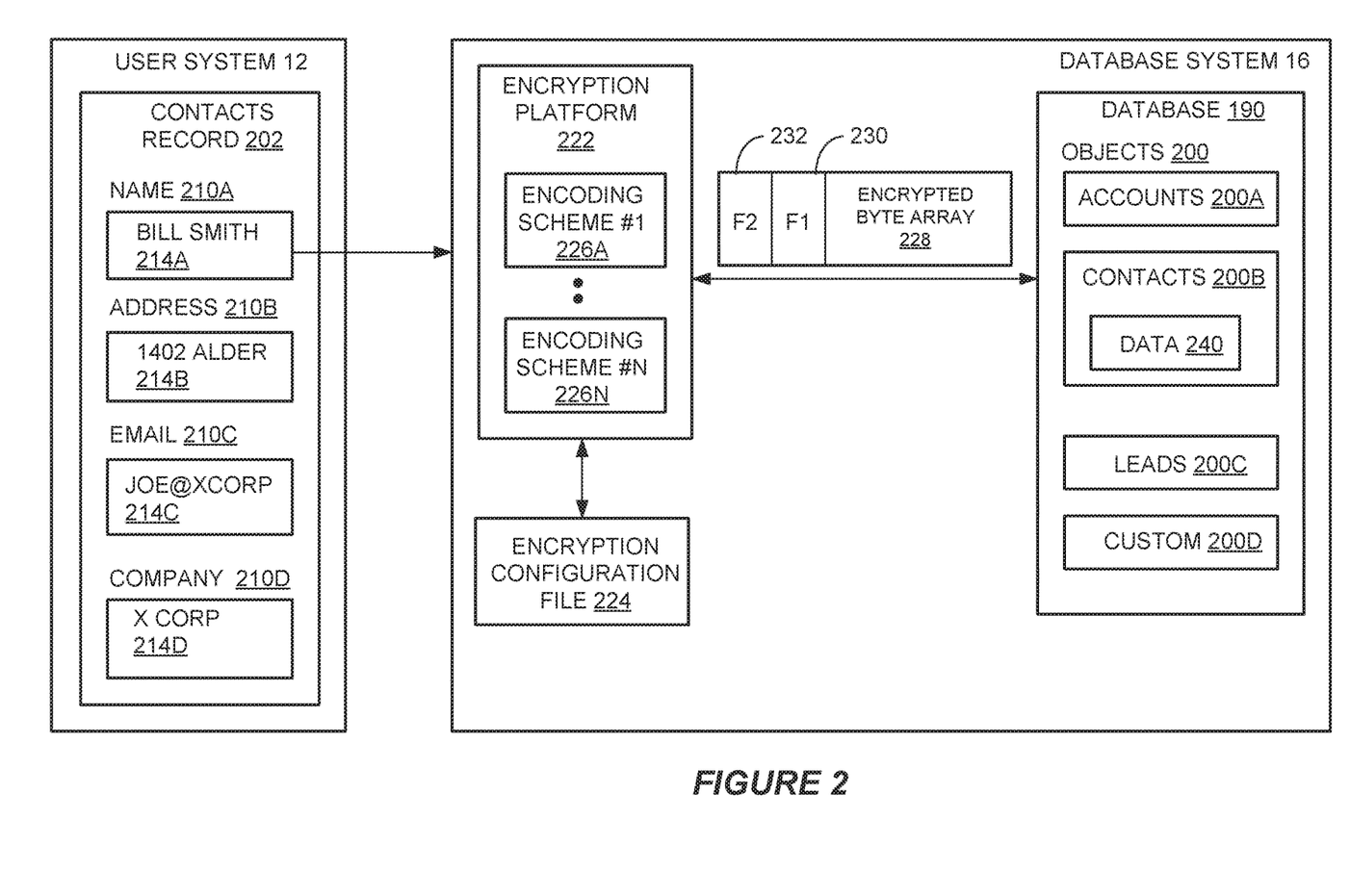
FIG. 2 shows an example encryption platform used in a database system.

FIG. 2 shows an example encryption platform 222 operating in database system 16. Any combination of servers, processors, memory, software, applications, logic etc. in database system 16 may implement encryption platform 222. In one example, encryption platform 222 may operate as a plugin to a relational database mapping framework, such as used in a universal data dictionary (UDD).

A user may access database system 16 via user system 12 as described above. In one example, the user is any person authorized to access a database 190 of objects 200 stored in database system 16. For example, the user may be a salesman that stores information about different customers or the user may be a system administrator or an information technologist (IT) that manages and configures database 190 and/or database system 16.

Database 190 may store objects 200 for any tenant, business, entity, organization, etc. In one example, objects 200 may include accounts object 200A, contacts object 200B, leads object 200C, and custom object 200D. Of course these are just examples and objects 200 may include any type of data or data structure for any type of information.

In one example, a tenant may include a group of users who share a common access with specific privileges to a software instance. A multi-tenant architecture may provide the tenant with a dedicated share of the software instance typically including one or more of tenant specific data, user management, tenant-specific functionality, configuration, customizations, non-functional properties, associated applications, etc.

Each object 200 may include multiple records 202 that contain multiple fields 210. For example, contacts object 200B may include records 202 that include name field 210A, address field 210B, email field 210C, and company field 210D. Again, these are just examples and any type of field 210 may exist in any type of object 200. The user may access objects 200 via user system 12 and create a new record 202, edit an existing record 202, and/or view an existing record 202. For example, the user may enter a name Bill Smith into name field 210A of record 202.

Encryption platform 222 monitors requests from user system 12 to save field values 214. For example, user system 12 may send a request to database system 16 to save the name Bill Smith (name 214A). Encryption platform 222 may check an encryption configuration file 224 to determine if name field 210A was previously selected for encryption. Encryption platform 222 may encode and encrypt name 214A when field 210A for contacts object 200B is identified in encryption configuration file 224.

For any field 210 identified in encryption configuration file 224, encryption platform 222 selects one of encoding schemes 226 that encodes the associated field value 214 in a fewest number of bytes. For example, a first encoding scheme 226A may encode Latin characters in one byte and may encode most Chinese characters in three bytes. A second encoding scheme 226N may encode both most Latin characters and Chinese characters into two bytes. Encryption platform 222 may select either encoding scheme 226A or encoding scheme 226N that encodes field value 214 into a smallest number of bytes.

For example, encryption platform 222 may select first encoding scheme 226A when name 214A includes all or a substantial proportion of Latin characters. Encryption platform 222 may select second encoding scheme 226N when name 214A includes all or a substantial proportion of non-Latin characters. Encryption platform 222 uses the selected encoding scheme 226 to encode name 214A into a series of bit values alternatively referred to as a byte array. Encryption platform 222 then encrypts the byte array and stores the encrypted byte array 228 (ciphertext) in database 190.

Encryption platform 222 may assign an encoding flag 230 to encrypted byte array 228 identifying the encoding scheme 226 used for encoding name 214A. For example, encryption platform 222 may append a header of one or more bits to encrypted byte array 228 identifying the selected encoding scheme 226. Encryption platform 222 also may assign an encryption flag indicating byte array 228 is encrypted.

Database system 16 may receive a request from user system 12 to read data 240 from database 190. Encryption platform 222 may determine if data 240 includes an encryption flag 232. Encryption platform 222 decrypts data 240 that includes an encryption flag 232 and does not decrypt data 240 that does not include an encryption flag 232.

For the decrypted data, encryption platform 222 may read encoding flag 230 to identify the encoding scheme 226 previously used for encoding field value 214 into a byte array. Encryption platform 222 uses the identified encoding scheme 226 to decode the byte array back into plaintext characters. Database system 16 then sends the decrypted and decoded plaintext for the field value 214 to user system 12.

Figure 3:
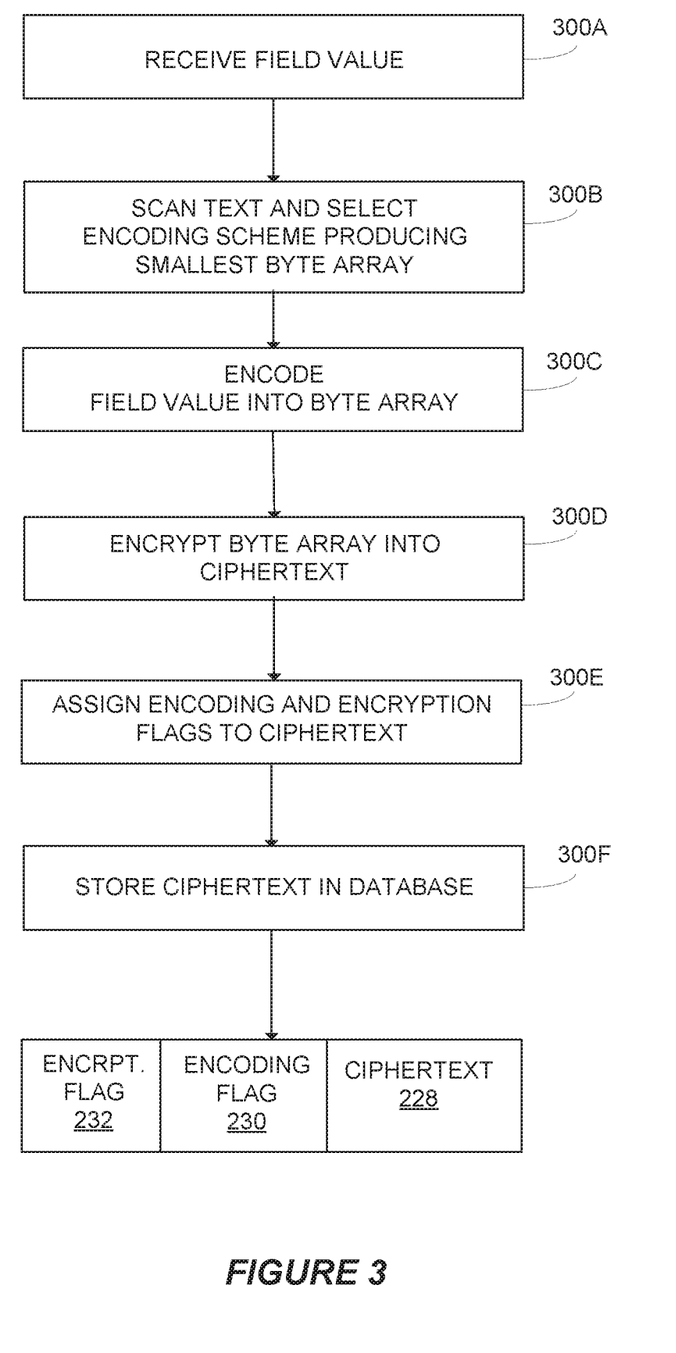
FIG. 3 shows an example process for encoding and encrypting data.

FIG. 3 depicts a sample process for efficiently encrypting data. In operation 300A, the encryption platform may receive a field value. For example, a user system may send a request to the database system to save a field value.

In operation 300B, the encryption platform may scan the text in the field value to dynamically determine which encoding scheme produces a smallest byte array. As explained above, the encryption platform may encode Latin characters (via UTF8) in a very space-efficient one byte per character manner. In the case where the field value contains many non-Latin characters, the UTF16 encoding may be more compact than storing plaintext for the field value directly in the database with UTF8. Accordingly, the encryption platform may use the UTF8 encoding scheme for encoding a field value with predominately Latin characters and use the UTF16 encoding scheme for encoding a field value with predominately Chinese characters.

In operation 300C, the encryption platform may use the selected encoding scheme to encode the field value into a byte array. For example, selecting the UTF8 encoding scheme may encode each Latin character into one byte and encode most Chinese character into three bytes. Selecting the UTF16 encoding scheme may encode most Latin and Chinese character into two bytes. Of course this is just one example, and the encryption platform may use any number of encoding schemes for any number and combination of language characters.

The UTF8 encoding scheme may encode some non-Latin characters in more than three bytes and the UTF16 encoding scheme may encode some characters in more than two bytes. However, these outlier characters may rarely occur and in some database systems may not be allowed. For explanation purposes the outlier characters are not described in further detail below. However, the encryption platform may count any additional bytes from outlier characters when determining which encoding scheme produces the smallest byte array.

In operation 300D, the encryption platform encrypts the byte array. For example, the encryption platform may use an encryption scheme, such as advanced encryption standard (AES), to encrypt the byte array into ciphertext 228. In operation 300E, the encryption platform may assign an encoding flag 230 and an encryption flag 232 to ciphertext 228. As mentioned above, the encryption platform may assign encoding flag 230 to ciphertext 228 to indicate the type of encoding scheme used for encoding the field value and assign control flag 232 to ciphertext 228 identifying the associated field value as encrypted.

Some database systems may only include text columns. In this case, the encryption platform may convert ciphertext 228 back into text for storage in the text columns. For example, the encryption platform may convert ciphertext 228 into Latin characters using base64. Thus, encryption platform reduces the overall number of bytes stored in the database by dynamically selecting encoding schemes that more efficiently encode the combination of language characters in the field values.

Figure 4:
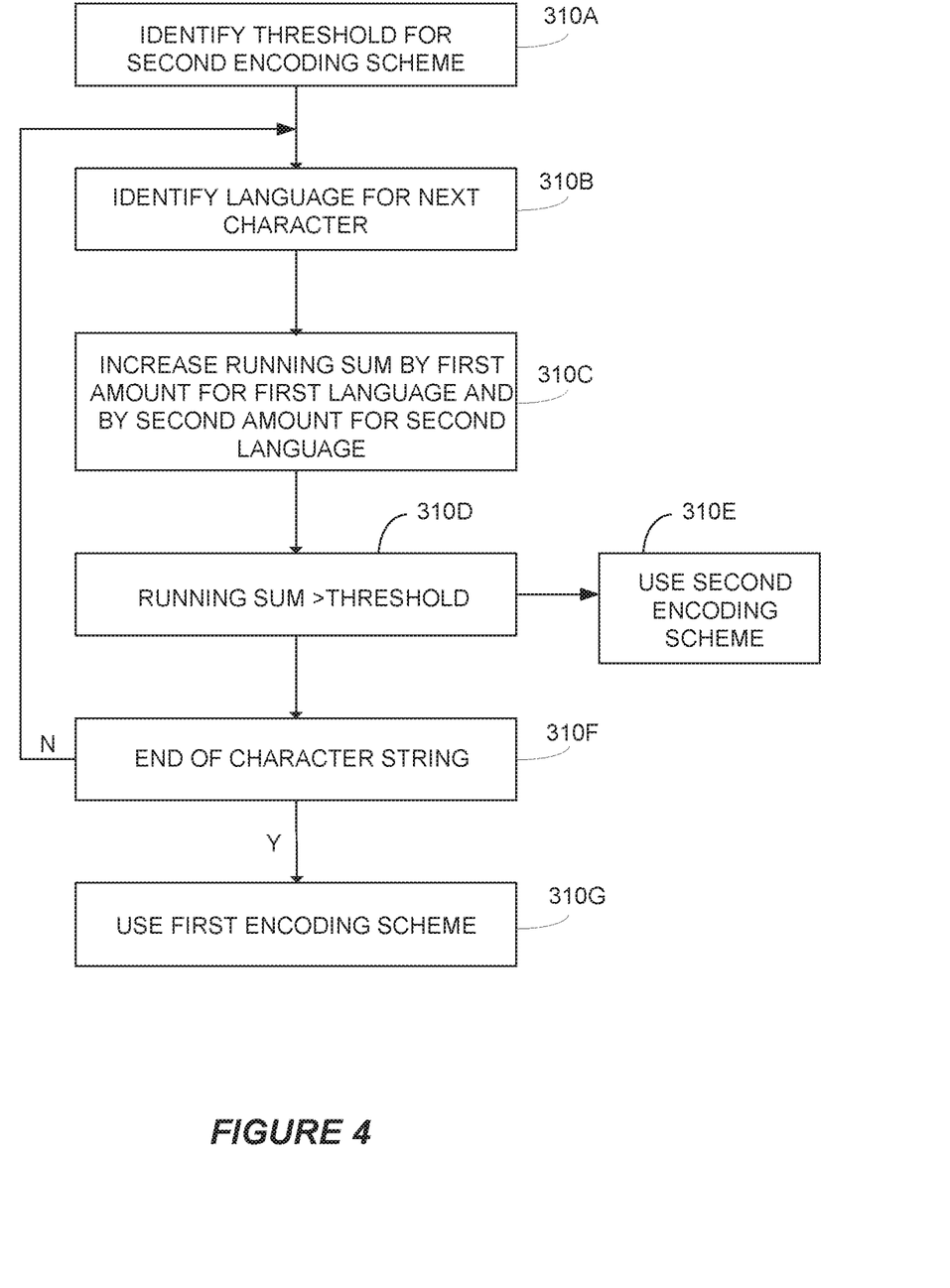
FIG. 4 shows an example process for selecting different encoding schemes for encoding field values.

FIG. 4 depicts an example process for dynamically selecting different encoding schemes to reduce the size of encoded byte arrays. The field value may include characters for different languages. For example, the field value may include all Latin characters, all Chinese characters, or a combination of both Latin and Chinese characters. The field values may include characters for other languages, such as other Asian, European, Middle Eastern, African, or American languages.

As described above, a first encoding scheme may encode each Latin character in one byte and encode Chinese characters in three bytes, and a second encoding scheme may encode both Latin and Chinese characters in two bytes.

In operation 310A, the encryption platform may identify a threshold byte size for the second encoding scheme. For example, the second encoding scheme referred to above may encode any combination of five Latin and Chinese characters in 5 characters×2 bytes/character=10 bytes. The encryption platform may use 10 as the decision threshold for using either the first encoding scheme or the second encoding scheme to encode the five character field value.

In operation 310B, the encryption platform identifies the language for the next character in the field value. In operation 310C, the encryption platform increases a running sum based on the number of bytes used by the first encoding scheme for encoding the character. For example, the encryption platform may set the initial running sum to 1 for a first Latin character and set the intial running sum to three for a first Chinese character.

In operation 310D, the encryption platform compares the running sum calculated in operation 310C with the threshold value calculated in operation 310A. For example, after a first Latin character the running sum=1 byte. The database may jump back to operation 310B to identify the language of the next character when the running sum in operation 310D is less than the 10 byte threshold and the field value includes additional characters.

In operation 310B, the encryption platform may identify the second character in the field value as a Chinese character. In operation 310C, the encryption platform increases the running sum by 3 to represent the number of bytes used by the first encoding scheme to encode the second Chinese character. In operation 310D, the encryption platform compares the new running sum of 4 with the threshold value of 10 derived in operation 310A. The encryption platform jumps back to operation 310B and identifies the language for the next character since the running sum is still less than 10 and the second character is not the last character in the field value The encryption platform continues increasing the running sum in operation 310C for each additional character until the last character of the field value is reached in operation 310F or the running sum exceeds the threshold value in operation 310D. In operation 310E, the encryption platform uses the second encoding scheme (e.g., UTF16) when the running sum exceeds the threshold value.

In operation 310G, the encryption platform uses the first encoding scheme (e.g., UTF8) when the running sum for all characters in the field value does not exceed the threshold value. In other words, the encryption platform selects one of the first encoding scheme in operation 310G or the second encoding scheme in operation 310E that encodes the field value in the fewest number of bytes.

The encryption platform may use other algorithms for dynamically selecting different encoding schemes. For example, the database may select encoding schemes based on the language used in the first character or first few characters. The specific algorithms used for dynamically selecting different encoding schemes also may vary depending on the language characters used in the field values, the encoding schemes used for encoding the characters, and/or the maximum byte width of columns in the database system.

Figure 5:
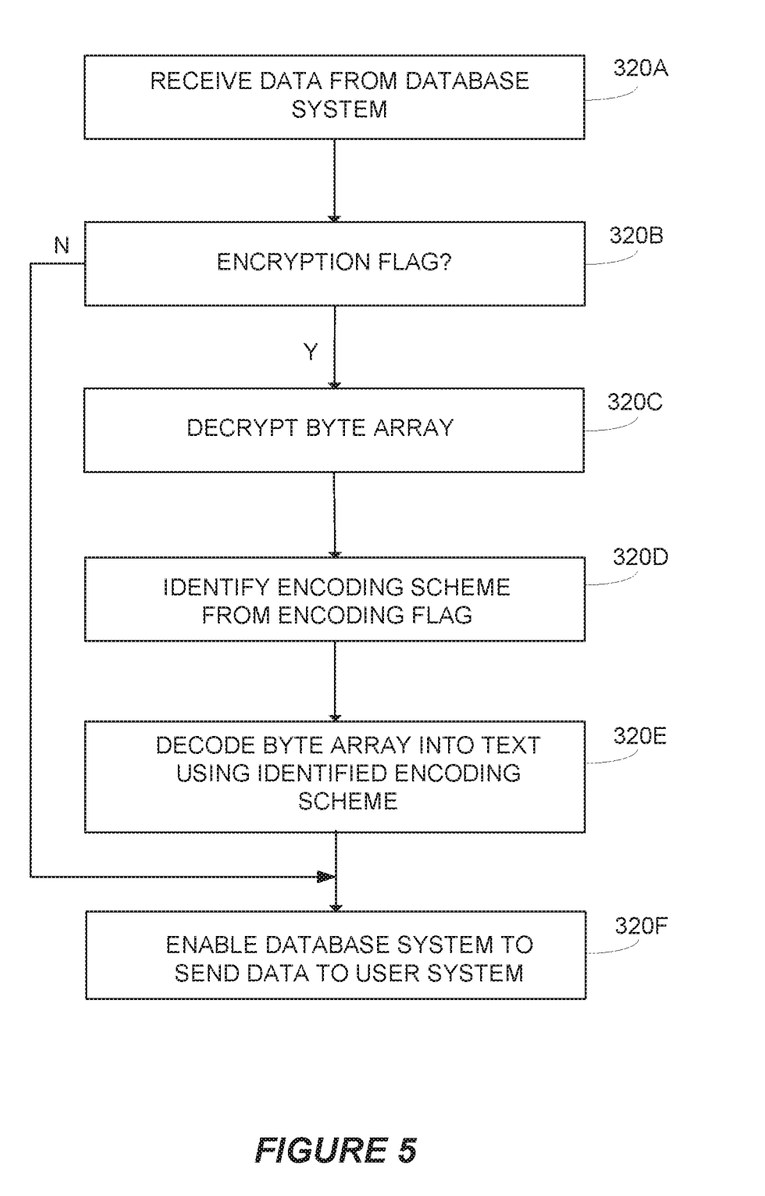
FIG. 5 shows an example process for decrypting data encoded with different encoding schemes.

FIG. 5 depicts an example process for decrypting data. In operation 320A, the encryption platform may receive data from the database system. For example, a user system may select a record for viewing. In operation 320B, the encryption platform determines if any of the data for the selected record includes an encryption flag. In operation 320F, the encryption platform does not decrypt data without an encryption flag and causes the database system to send the requested data to the user system.

In operation 320C, the encryption platform decrypts data that includes an encryption flag. For example, the encryption platform may use AES decryption to decrypt previously encrypted ciphertext back into a byte array.

As mentioned above, the encryption platform may have assigned an encoding flag to the ciphertext identifying the encoding scheme used for encoding the plaintext field value into a byte array. In operation 320D, the encryption platform identifies the encoding scheme from the encoding flag.

In operation 320E, the encryption platform may use the identified encoding scheme to decode the byte array into plaintext characters. In operation 320F, the encryption platform causes the database system to send the decoded plaintext characters for the field value to the user system.

Figure 6:
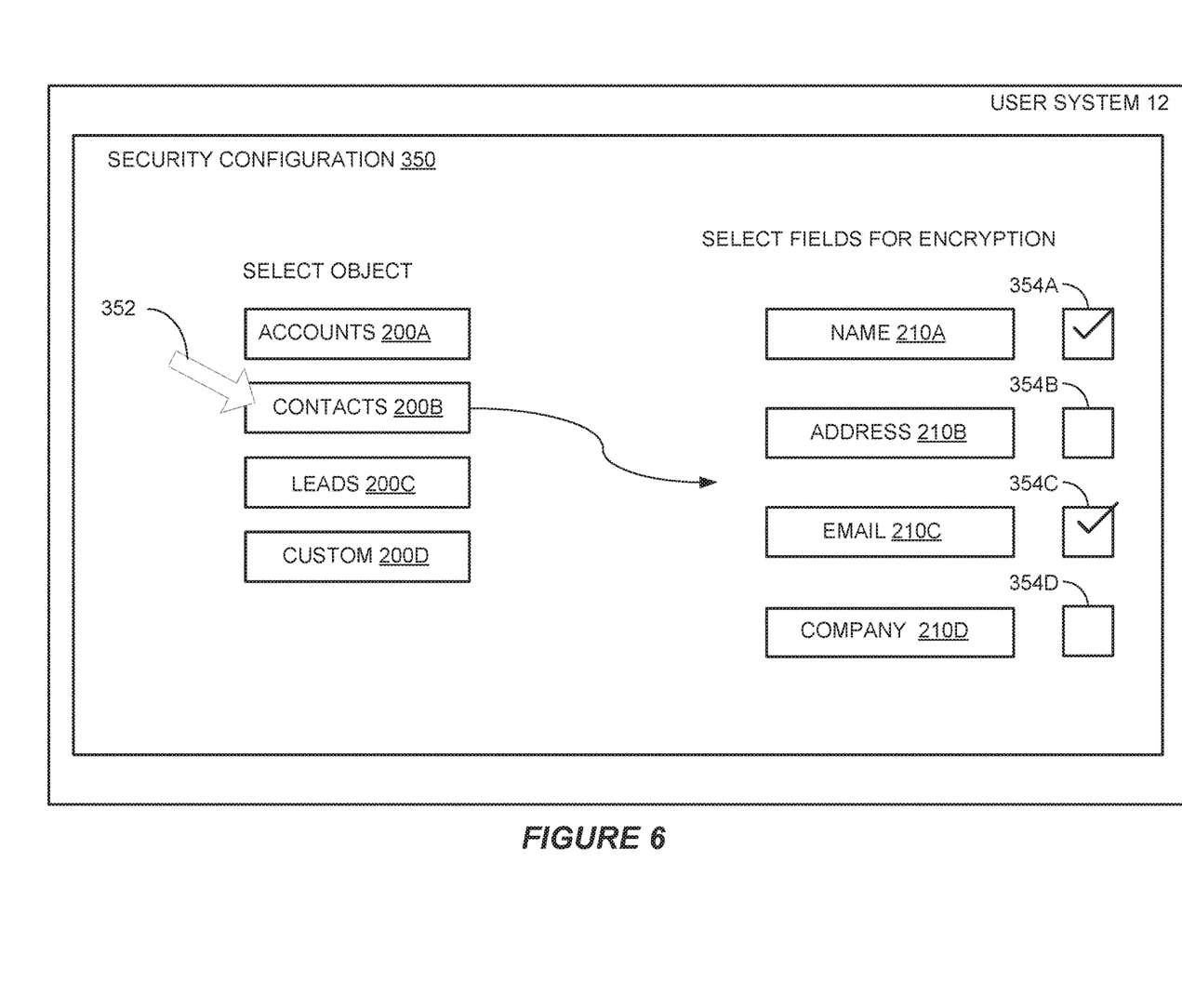
FIG. 6 shows a user interface for selecting different fields in different objects for encryption.

FIG. 6 depicts an example user interface for selecting different fields for encrypting. Referring to FIGS. 2 and 6, encryption platform 222 may display a user interface page 350 on a screen of user system 12. For example, a user may select an application on database system 16 that operates encryption platform 222. Encryption platform 222 may display different objects 200 stored in database system 16. As described above, objects 200 may include accounts object 200A, contacts object 200B, leads object 200C, and custom object 200D. Of course these are just examples and encryption platform 222 may display any object, field, or other data stored on database system 16.

In this example, the user may use a cursor 352 to select an icon associated with contacts object 200B. Encryption platform 222 displays fields 210 for contacts object 200B in response to the selection by cursor 352. The user may select any of fields 210 for contacts object 200B by selecting associated boxes 354. In this example, the user selects name field 210A and email field 210C by selecting boxes 354A and 354C, respectively.

Encryption platform 222 creates and/or updates encryption configuration file 224 in FIG. 2 in response to selection of boxes 354A and 354C to include name field 210A and email field 210C for contacts object 200B. Encryption platform 222 then encodes and encrypts values for fields 210A and 210C as described above. For example, encryption platform 222 detects a request from user system 12 to store a value. Encryption platform 222 determines if any field and object associated with the value is located in encryption configuration file 224. If so, encryption platform 222 encodes and encrypts the identified value as described above.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer program stored on a non-transitory storage medium for encrypting a field value stored in a database system, the computer program comprising a set of instructions, when executed by a hardware processor, to cause the database system to:
   receive the field value associated with a data object or a table in the database system;
   identify types of language characters in the field value;
   select an encoding scheme from among multiple different encoding schemes to encode the field value based on the types of language characters in the field value;
   use the selected encoding scheme from the multiple different encoding schemes to encode the field value into a byte array;
   encrypt the encoded byte array of the field value and assign an encoding flag to identify the encoding scheme used to decode the encoded field value; and
   store the encoding flag and the encrypted byte array in the database system.

2. The computer program of claim 1, further comprising instructions operable to cause the database system to select the encoding scheme from the multiple different encoding schemes that uses a fewest number of bytes to encode the field value.

3. The computer program of claim 1, further comprising instructions operable to cause the database system to:
   detect a request to read the field value;
   decrypt the encrypted byte array;
   select the encoding scheme identified by the encoding flag to decode the byte array into the language characters in the field value; and
   send the language characters to a user device.

4. The computer program of claim 1, further comprising instructions operable to cause the database system to:
   calculate a first number of bytes for encoding the field value using a first one of the encoding schemes;
   calculate a second running sum of bytes to encode sequential characters in the field value using a second one of the encoding schemes;
   select the first one of the encoding schemes for encoding the field value when the second running sum of bytes exceeds the first number of bytes; and
   select the second one of the encoding schemes for encoding the field value when the second running sum of bytes for all of the characters in the field value does not exceed the first number of bytes.

5. The computer program of claim 1, further comprising instructions operable to cause the database system to:
   select a first one of the encoding schemes to encode the field value when a majority of the language characters are for a first language; and
   select a second one of the encoding schemes to encode the field value when a majority of the language characters are for a second language.

6. The computer program of claim 1, further comprising instructions operable to cause the database system to:
   use an 8 bit unicode transform format (UTF8) encoding scheme to encode the field value when a majority of the language characters are Latin; and
   use a 16-bit unicode transform format (UTF16) to encode the field values when a majority of the language characters are Chinese.

7. The computer program of claim 1, further comprising instructions operable to cause the database system to:
   detect requests to save the field value for different records; and
   for each one of the different records, individually and dynamically select from among the multiple different encoding schemes to encode the field value based on the types of language characters used in the field value for the different records.

8. The computer program of claim 1, further comprising instructions operable to cause the database system to:
   display fields for different objects on a user interface;
   receive selections of at least some of the fields for at least some of the different objects;
   only encode and encrypt the field value for the selected fields.

9. An encryption platform for operating in a database system, comprising:
   a hardware processor; and
   memory storing one or more stored sequences of instructions which, when executed by the hardware processor, cause the hardware processor to carry out the steps of receiving data associated with requests from user systems to save the data in the database system;
   scanning the data for each of the requests to identify which encoding scheme from among multiple encoding schemes encodes the data in a smallest number of bytes;
   encoding the data for each of the requests into a byte array using the encoding scheme identified as encoding the data in the smallest number of bytes from the multiple encoding schemes;
   encrypting the encoded byte array into ciphertext;
   assigning an encoding flag to the ciphertext identifying the encoding scheme used for encoding the data and to decode the encoded byte array; and
   storing the encoding flag and the ciphertext in the database system.

10. The encryption platform of claim 9, wherein the instructions further cause the processor to carry out the steps of:
    calculating a first number of bytes used for encoding the data with a first one of the encoding schemes;
    calculating a second running sum of bytes used for serially encoding individual characters in the data using a second one of the encoding schemes;
    selecting the first one of the encoding schemes for encoding the data when the second running sum of bytes exceeds the first number of bytes; and
    selecting the second one of the encoding schemes for encoding the data when the second running sum of bytes for all of the characters in the data is less than the first number of bytes.

11. The encryption platform of claim 10, wherein the instructions further cause the processor to carry out the steps of:
    using a 16-bit unicode transform format (UTF16) as the first one of the encoding schemes; and
    using an 8-bit unicode transform format (UTF8) as the second one of the encoding schemes.

12. The encryption platform of claim 9, wherein the instructions further cause the processor to carry out the steps of assigning a header to the ciphertext identifying the ciphertext as encrypted.

13. The encryption platform of claim 9, wherein the instructions further cause the hardware processor to carry out the steps of:
    identifying fields for different objects in the database system;
    receiving selections of different ones of the fields for different ones of the objects for encrypting; and creating an encryption configuration file identifying the fields selected for encrypting.

14. The encryption platform of claim 13, wherein the instructions further cause the hardware processor to carry out the steps of only encoding and encrypting the data associated with the fields identified in the encryption configuration file.

15. The encryption platform of claim 10, wherein the instructions further cause the hardware processor to carry out the steps of:
identifying different types of language characters in the data; and
for each of the requests, identifying which encoding scheme to use for encoding the data based on the different types of language characters in the data.

16. A method for encrypting data in a database system, comprising:
receiving requests to store the data in the database system;
scanning the data for each of the requests for different language characters;
identifying a number of bits used by different encoding schemes for encoding the language characters in the data;
for each of the requests, selecting one of the encoding schemes encoding the data in a fewest number of bits;
using the selected one from the different encoding schemes to encode the data into byte arrays;
encrypting the encoded byte arrays into encrypted data and assigning headers to the encrypted data to identify the encoding scheme used to encode the data and to decode the encoded data; and
storing the headers and the encrypted data in the database system.

17. The method of claim 16 further comprising:
receiving selections of different fields for different objects for encryption; and
only encoding and encrypting the data associated with the selected fields.

18. The method of claim 16 further comprising:
identifying the number of bits used by a first one of the encoding schemes for encoding the data, the data including the language characters for both a first language and a second language;
identifying the number of bits used by a second one of the encoding schemes for encoding the data; and
selecting the first one of the encoding schemes or the second one of the encoding schemes using a fewest number of bits to encode the data.

* * * * *